UNITED STATES PATENT OFFICE.

JOHN BARRACK RENNIE, OF MANCHESTER, ENGLAND.

METAL-CUTTING TOOL.

1,397,983. Specification of Letters Patent. Patented Nov. 22, 1921.

Application filed October 27, 1919. Serial No. 333,637.

*To all whom it may concern:*

Be it known that I, JOHN BARRACK RENNIE, a subject of the King of Great Britain and Ireland, and resident of 246 Brunswick street, Oxford Road, Manchester, England, have invented certain new and useful Improvements in Metal-Cutting Tools, of which the following is a specification.

This invention relates to metal cutting tools and has for its object to provide an improved construction of composite tool in which economy of high speed steel is insured while high efficiency and ready adaptability for various services is obtained.

Referring to the accompanying sheet of explanatory drawings:—

Figure 1:
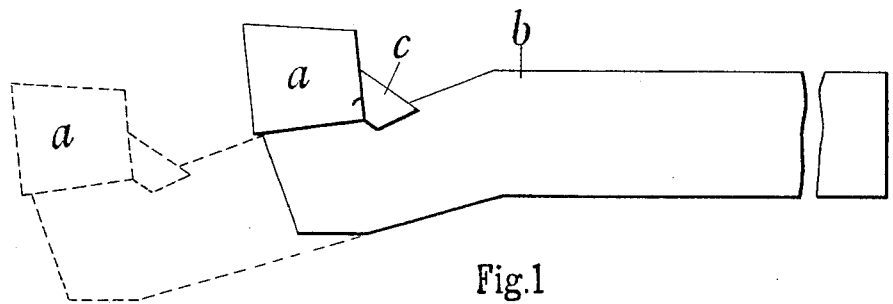
Figure 2:
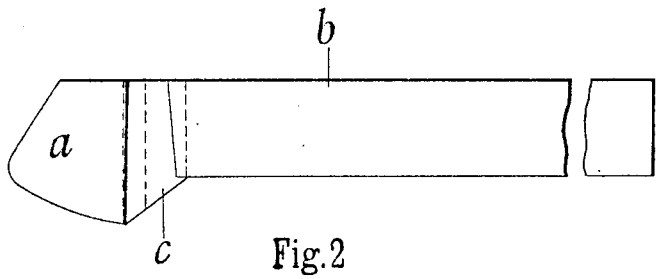

Figure 1 is an elevation and Fig. 2 a plan illustrating a cutting tool as constructed in accordance with this invention.

The same reference letters in the two views indicate the same parts.

In accordance with my invention, the tool shank which is preferably made of toughened carbon steel is bent toward the end to which the piece $a$ of high speed steel forming the cutter is secured. By such bending a considerable depth of high speed steel can be employed, thus providing for continued wear or a long working life for the tool. Further, the said high speed steel bit $a$ can be positioned at any desired distance above or below the top $b$ of the tool shank by varying the distance or extent to which the tool shank is bent down as aforesaid. Thus, for example, in the full line position of the bit $a$ shown at Fig. 1, the cutting edge of the tool is above the top $b$ of the shank, whereas by cranking or bending the tool to the extent shown by dotted lines in the said figure, the cutting edge of the tool is below the said top $b$ of the shank.

The high speed steel bit $a$ is welded to the shank and is further secured by a strut or key piece $c$ which enters an undercut recess extending across the face of the shank at the rear of the bit and forms a dovetailed joint or connection therewith. The back edge of the bit is thus firmly held against displacement by the abutment or support afforded by the said strut $c$. The bit or cutter $a$ and the said strut $c$ which is formed integrally with $a$ can only be inserted in place or withdrawn by a cross movement, relatively to the shank and a firm hold is therefore provided during working independently of the welding of the bit upon the shank or holder.

The shape of the bit and the tool shank are varied to suit requirements.

Having now described my invention, what I claim as new and desire to secure by Letters Patent, is:—

In metal cutting tools, the combination consisting of a bent and recessed shank or holder, a cutter seating upon and welded to the bent portion of said holder, and a strut integral with the said cutter and in dovetailed connection with the recessed portion of the holder, as set forth.

In testimony whereof I have signed my name to this specification.

JOHN BARRACK RENNIE.